United States Patent [19]

De Caro

[11] Patent Number: 4,959,938
[45] Date of Patent: Oct. 2, 1990

[54] NON-SEATING PLATE/FASTENER ASSEMBLY

[76] Inventor: Charles J. De Caro, 6530 Havenlock Pl., Charlotte, N.C. 28215

[21] Appl. No.: 399,598

[22] Filed: Aug. 28, 1989

[51] Int. Cl.⁵ .............................................. E04B 5/00
[52] U.S. Cl. ..................................... 52/410; 411/399; 411/413
[58] Field of Search .................. 52/410; 411/399, 412, 411/413

[56] References Cited

U.S. PATENT DOCUMENTS

| | | | |
|---|---|---|---|
| 2,292,554 | 8/1942 | Wilson | 411/413 |
| 4,074,501 | 2/1978 | Sandqvsit | 52/410 X |
| 4,275,541 | 6/1981 | Orals et al. | 411/412 X |
| 4,361,997 | 12/1982 | De Caro | 52/410 X |
| 4,455,804 | 6/1984 | Francovitch | 52/410 X |
| 4,653,244 | 3/1987 | Farrell | 411/412 X |
| 4,726,164 | 2/1988 | Reinwall et al. | 52/410 |
| 4,781,503 | 11/1988 | Bögel | 52/410 X |
| 4,787,188 | 11/1988 | Murphy | 52/410 |

Primary Examiner—David A. Scherbel
Assistant Examiner—Linda J. Hoffert
Attorney, Agent, or Firm—Chilton, Alix & Van Kirk

[57] ABSTRACT

A fastener/plate assembly for fastening material to a roof deck employs a threaded fastener having a shank with two thread sections. The distal end portion of the shank has a thread which is loosely insertable through an opening of the plate. A second thread of the shank has a thread diameter greater than the first section and is threadably engageable with the plate. The driver end of the fastener is dimensioned so that during an overdrive condition, the fastener may threadably disengage from the plate to allow the driver end to pass through the stress plate opening.

19 Claims, 3 Drawing Sheets

NON-SEATING PLATE/FASTENER ASSEMBLY

BACKGROUND OF THE INVENTION

This invention relates generally to plates and fasteners which are employed for securing insulation and the like to roof decks. More particularly, the present invention relates to threaded fasteners which engage stress plates for fastening insulation and like material to roof decks.

In roof systems to which the present invention relates, threaded fasteners engage metal plates or plastic plates of various configurations to secure insulation material to a metal roof deck. Plies of synthetic coating, tar, gravel or various roofing materials are then applied over the insulation to complete the roof. Most of the plates employed for such roofing applications, whether they be composed of metal or plastic, have a pre-fabricated central opening which receives the fastener. The plates have a generally planar portion for engaging the insulation along a substantial surface area. The plates are sufficiently rigid to secure the insulation to the deck under intense wind-produced lift forces which may be exerted on the roof.

Plastic and/or molded stress plates have in many instances replaced the conventional metal plates. Among a number of advancements in plate/fastener technology are improved provisions for aligning the fastener as it penetrates the insulation and metal deck, improved structures for preventing the plate from being pulled over the fastener, improved moisture repellent characteristics, and improved structures to lessen the tendency of the plate to cut or penetrate the plies of material installed over the insulation.

Both metal and plastic stress plates are susceptible to the fastener being overdriven (excessive penetration depth into the anchoring deck) resulting in an excessive load being exerted on the plate. While installation tools for driving the fasteners ordinarily employ depth setting mechanisms which are directed to prevent overdriving of the fastener, such tools require a critical depth adjustment necessitating periodic field adjustments. In a number of installation projects either no depth adjustment tool is employed and/or the installation tool is not properly adjusted for the specific roof construction.

U.S. Pat. No. 4,361,997, invented by the inventor of the present invention and entitled, "Fastener Plate and Assembly", discloses a plastic plate employed in combination with a threaded fastener to secure insulation to a metal roof deck. The plate has a planar portion with a centrally disposed tapered hub. A central bore through the hub is dimensioned to facilitate proper alignment of the fastener as it is driven through the insulation into the roof deck so that a perpendicular orientation of the fastener to the deck is maintained. The head of the fastener is seated in a counterbore of the plate below the upper surface of the plate when the proper depth is obtained, thereby clamping the insulation to the deck. In such conventional fastening systems, the installation process must be essentially completed simultaneously with substantially the seating of the fastener in the counterbore of the plate.

A disadvantage of the fastener/plate assembly, such as disclosed in U.S. Pat. No. 4,361,997, as well as other assemblies wherein the fastener seats onto or within the stress plate, is the absence of effective means for tolerating fastener overdriving which can and does frequently occur during installation. Should the fastener be overdriven, the fastener head would force the plate into the insulation, potentially developing an excessive load on the plate. For a relatively soft and yielding insulation, the increased load exerted on the plate due to overdriving may not be sufficient to cause the plate to fail. However, if the insulation is relatively rigid or non-compressible (high compressive resistance), the load could result in stress cracking of the plate. The resistance to joint loosening may also be lost in overdriving the fastener. The threads which are formed in the plate could strip out so that the fastener loosens from the plate.

Over extended time periods, vibratory forces also tend to loosen the fastener. The fastener may pop above the plate and/or the plate may transform to a "reverse umbrella" configuration. In either case, the integrity of the roofing plies is threatened. Thus, the advantages of conventional fastening systems as discussed may even be negated over time by proper driving of the fastener.

SUMMARY OF THE INVENTION

Briefly stated, the invention in a preferred form, is a fastener/plate assembly for fastening material to a roof deck. The assembly comprises a stress plate having a hub which extends generally axially from the bottom surface of the plate. The plate and hub define a central opening of pre-established diameter. A fastener comprising a driver end, a distal end and a bifurcated shank portion, includes a first thread adjacent the distal end having a maximum thread diameter which is less than the diameter of the central opening. The other shank section has a second thread with a maximum diameter greater than the first thread. The second thread is threadably engageable with the hub portion. The diameter of the driver section may be less than the diameter of the opening.

The first section is loosely insertable in the opening and the second thread is threadable through the axial extent of the hub portion. The fastener and plate are dimensioned so that by the time the distal end of the fastener engages the roof deck, the plate has provided no alignment to the fastener since the second thread has yet to threadably engage the hub portion. Upon torqueably driving the driver end, the second thread is threadably disengageable from the plate to allow the driver end to axially pass through the opening. Anti-rotational projections may depend from either the upper or lower surface of the plate to prevent rotation of the plate. The fastener includes a non-threaded section which is axially intermediate the first and second threads. The thread pitch of the first thread is not equal to the thread pitch of the second thread.

An object of the invention is to provide a new and improved plate/fastener assembly for securing insulation and like materials to a roof deck.

Another object of the invention is to provide a new and improved plate/fastener assembly which is capable of effectively accommodating an overdriven condition of the fastener without excessive loads being exerted on the plate.

A further object of the invention is to provide a new and improved plate/fastener assembly which is resistant to vibratory forces tending to prevent the fastener from loosening from the roof deck.

A further object of the invention is to provide a new and improved plate/fastener assembly which greatly reduces the susceptibility of the plate to stress cracking upon installation and from puncturing or cutting into surrounding roofing material.

Other objects and advantages of the invention will become apparent from the drawings and the specification.

DETAILED DESCRIPTION OF THE INVENTION

Figure 1:
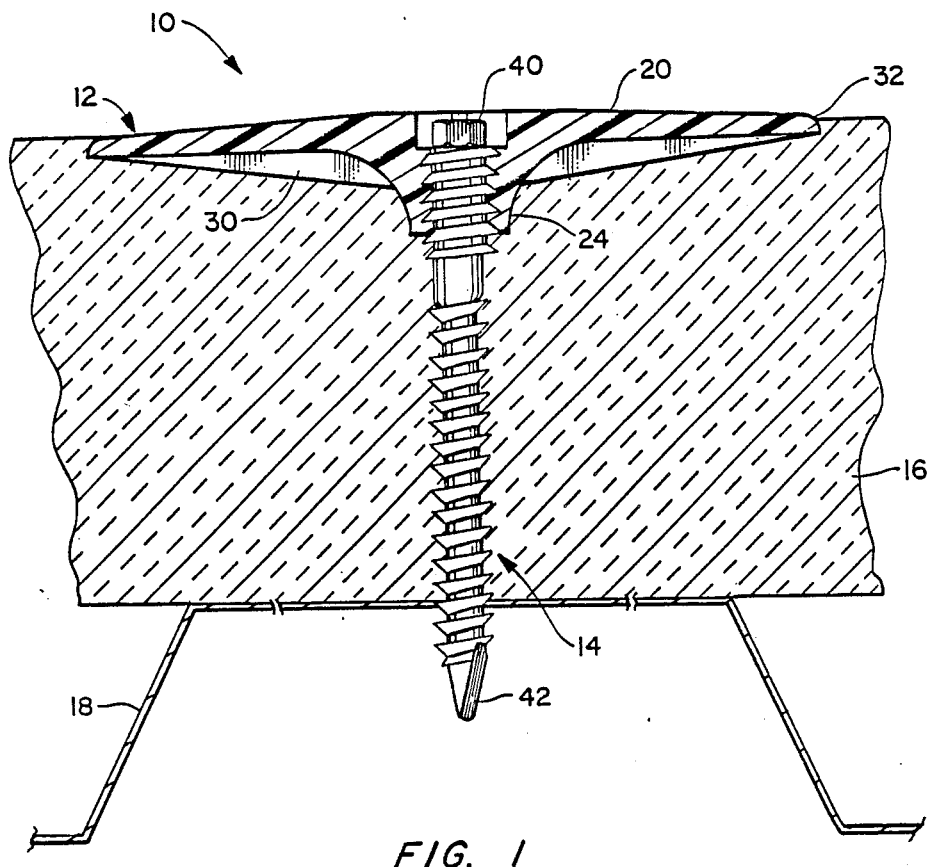
FIG. 1 is a sectional view taken through the central axis of a plate/fastener assembly in accordance with the present invention further illustrating the assembly in an installed position for fastening insulation to a roof deck.
Figure 2:
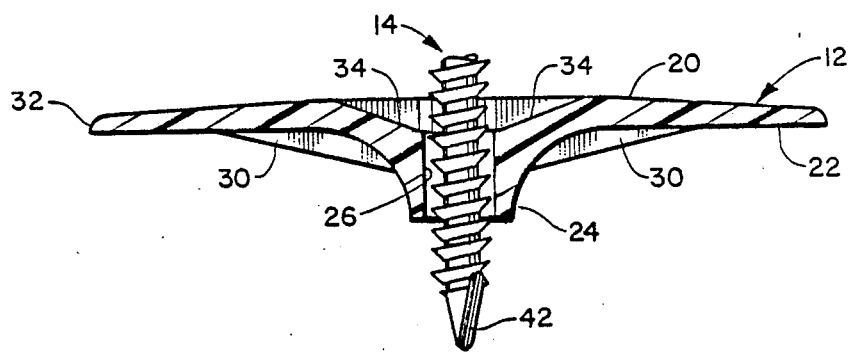
FIG. 2 a fragmentary sectional view of the plate/fastener assembly of FIG. 1 illustrating the fastener in a pre-installation position relative to the plate.
Figure 4:
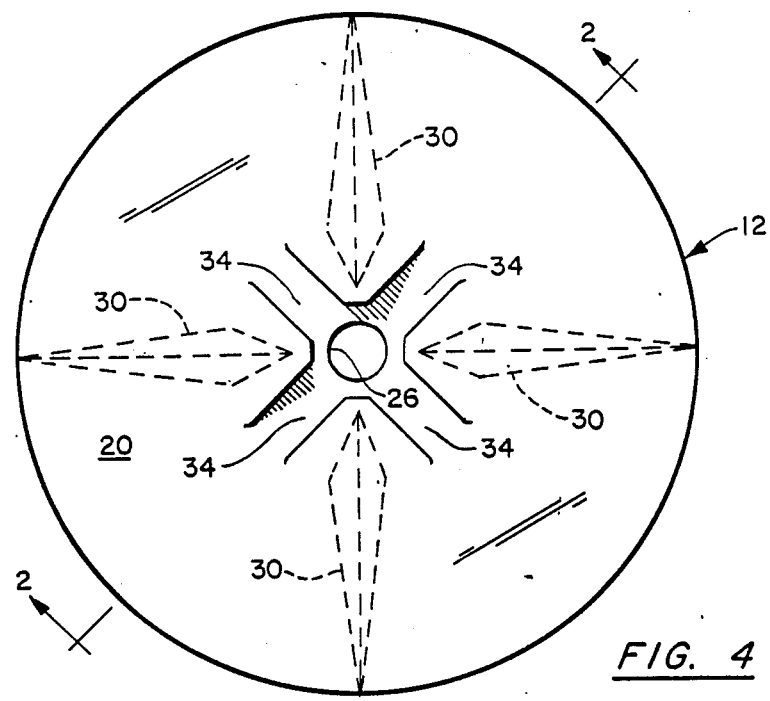
FIG. 4 a top plan view, partly in phantom of the plate of FIG. 1.
Figure 3:
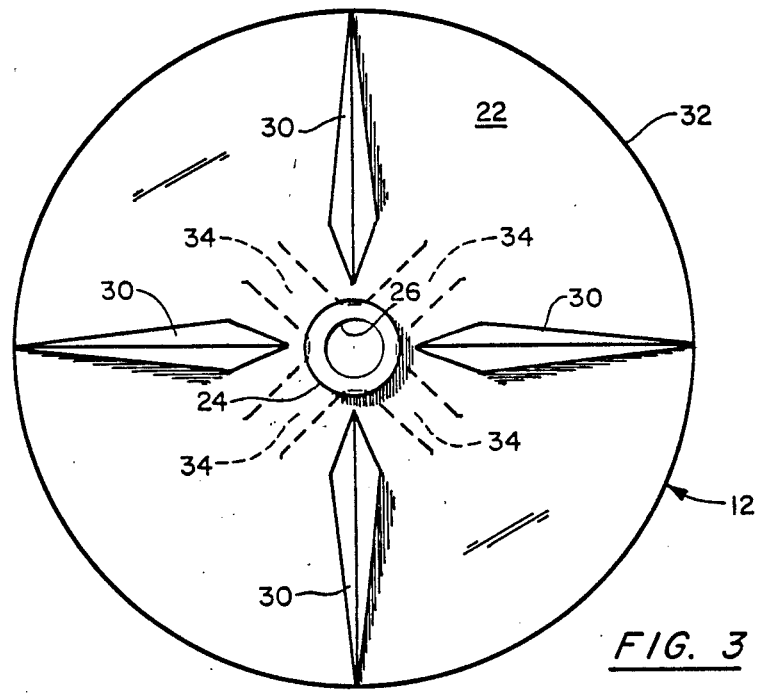
FIG. 3 is a bottom plan view, partly in phantom, of the plate of FIG. 1.

With reference to the drawings wherein like numerals represent like parts throughout the Figures, an installed non-seating plate/ fastener assembly, in accordance with the present invention, is generally designated by the numeral 10. Assembly 10 comprises a circular plastic stress plate 12 and a threaded fastener 14. Although not limited in its utility, the assembly is especially adapted for fastening insulation 16 to a metal roof deck 18 as best illustrated in FIG. 1. In the preferred application, a multiplicity of plate/fastener assemblies 10 are installed at spaced locations for attaching insulation board to the deck, and in certain instances for attaching membrane along the board seams. The fasteners are driven into the metal deck 18 by means of an installation tool (not illustrated).

The non-seating characteristic of the assembly refers to the relationship between the fastener and the plate wherein the fastener does not eventually assume an axially fixed seated relationship with the plate upon continuous application of a torque to the fastener regardless of the axial advance of the fastener relative to the plate. Stated differently, after the plate seats against the insulation or secured material, continued application of a torque to the fastener results in continued relative axial movement between the fastener and the plate until the fastener disengages from the plate.

The plate 12 has a top surface 20 which will ordinarily eventually be covered by plies of roofing material. The plate 12 has a bottom surface 22 which engages against the top of the insulation 16. A tapered hub 24 integrally extends from the bottom surface 22 at a central position thereof. An axial bore 26 extends through the hub. The hub portion may be exteriorly tapered to facilitate penetration into the insulation.

Anti-rotational structures which may be, for example, ribs 30, integrally project from the bottom surface and radially extend from the hub 24 to the peripheral edge 32 of the plate. The ribs 30 may be spaced every 90° around the central axis of the plate and may have an enlarged anchoring portion adjacent the hub portion and taper into a reduced convergent portion toward the outer edge 32.

Alternately, or in addition, projections which are angularly spaced for extension above the top surface 20 may be employed to prevent rotation of the plate upon installation of overlay material on the plate. Other anti-rotational structures may also be provided. However, the invention does not require any such anti-rotational structures. The top and bottom surfaces of the plate may thus also essentially be smooth surfaces.

Inclined recesses 34 in the plate may be employed for rotatably fixing the plate relative to an installation tool (not illustrated). The recesses 34 extend in perpendicular relationship and are adapted to mate with a complementary component of an installation tool.

Figure 5:
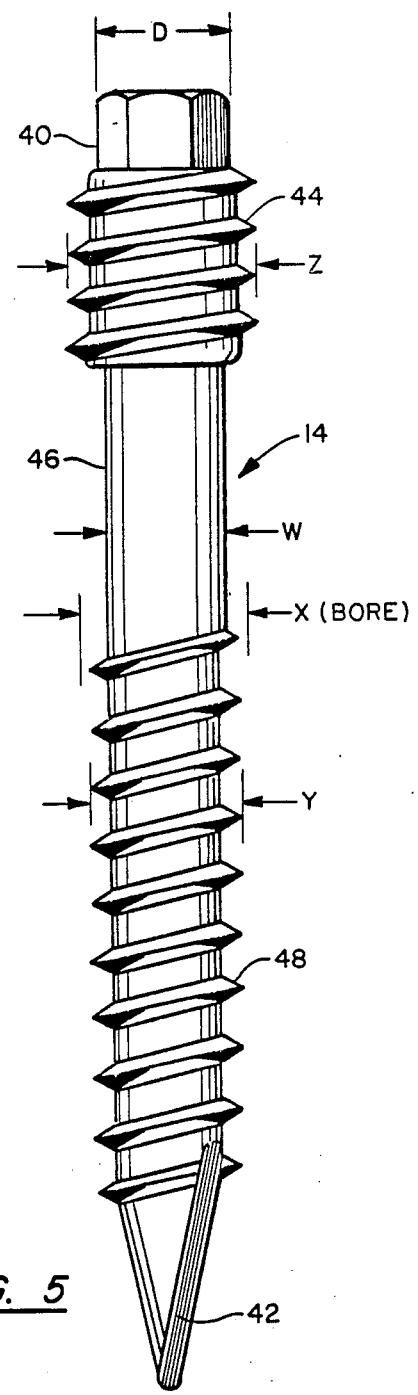
FIG. 5 is an enlarged side elevational view of the fastener of FIG. 1, said view further illustrating dimensional relationships.

The threaded fastener 14 longitudinally extends from a driver end 40 to a distal tapered tip 42 and includes (from driver end 40 to distal tip 42) a plate engaging thread 44, an intermediate non-threaded shank portion 46 and a deck engaging thread 48. In some embodiments, the interrupted or non-threaded shank portion is negligible. The threaded fastener 14 is specifically dimensioned in relation to the bore 26 of the stress plate 12 and can best be appreciated with reference to the dimensional relationships illustrated in the drawings (FIG. 5). The bore 26 (not illustrated in FIG. 5) has a uniform diameter X. The diameter Y of the reduced thread 48 is less than the diameter X. The diameter W of the non-threaded shank portion 46 is less than the reduced thread diameter Y. The thread diameter Z of the enlarged thread 44 is greater than the diameters W, X and Y. The maximum diameter D of the driver end 40 may be less than the corresponding diameter Z of the enlarged thread 44 as well as diameter X of the bore 26. In some embodiments the diameter D may slightly exceed diameter X. In addition, the thread pitch of the enlarged thread 44 is preferably less than or equal to the thread pitch of the reduced thread 48.

The foregoing dimensional relationships may be expressed by the following mathematical relationships:

$$Z > X$$

$$Y < X$$

$$W > Y$$

$$D < Z$$

Because of the recited dimensional features of the fastener 12 and the associated plate 14, the hub 24 does not provide any alignment properties as the fastener is initially being driven through the hub for penetration through the insulation into the roof deck. The reduced thread 48 and the non-threaded shank portion 46 are essentially freely loosely insertable through the bore 26. After the reduced thread 48 initially engages and continues to thread into the roof deck, at some pre-established depth depending upon the insulation thickness, the lead of the enlarged thread 44 will engage the top of the plate 12. The enlarged thread 44 will self-tap into the bore wall portion thereof to thereby create a threaded engagement between the fastener and the plate. The threading engagement of the enlarged thread 44 with the plate secures the plate against the insulation to essentially fasten the insulation in place and thereby resist any uplifting wind forces.

It should be appreciated that at no time does the fastener seat with the plate because the diameter D of the hex driver 40 is less than the diameter Z of the enlarged thread 44. Should the fastener be overdriven, the enlarged thread 44 will merely thread further into the plate. In the extreme instance, the enlarged thread 44 could, in theory, be threaded to a depth which entirely disengages the fastener from the plate.

Even if the driver diameter D slightly exceeds bore diameter X, the fastener driver end may axially penetrate the tapped hub and eventually completely traverse opening 26. If diameter D exceeds diameter X, the driver end 40 may distort the tapped hub portion to prevent reverse threading of the fastener. The diametral encroachment of the driver end into the hub (to the extent there is any encroachment) must be sufficiently small that the driver end does not fixably axially engage the plate to pull the plate toward the deck upon continued application of torque to the fastener. In the illustrated embodiment, driver diameter D is less than the bore diameter X, and there is no hub structure encroachment by the fastener. It should be appreciated that the severe stress loading against the plate which is characteristic of a conventional seated fastener will not occur in assembly 10. In addition, visible evidence that the fastener is overdriven will be apparent from visual inspection of the plate.

It is preferred for the described roof applications that the pitch of the enlarged thread 44 be smaller than that of the reduced thread 48. The foregoing relationship provides that for every threaded revolution into the deck, the fastener axially advances a pre-established distance, but the plate advances only a fraction of the distance. Consequently, the plate 12 would be forced to penetrate into the insulation an axial distance proportional to the ratio of the thread pitches. Stated differently, the plate 12 would be forced into the insulation an axial distance equal to the distance between the thread leads. The mismatch of the thread pitches (or leads) is functionally possible because the insulation material is not sufficiently rigid to cause any stripping in the plate.

It should be further appreciated that the thread 44 now also functions to resist the loosening of the fastener from the deck by the loosening resistance created by the threading engagement of the thread 44 and the plate 12. The vibratory forces tending to loosen the shank thread will encounter an independent resistance to loosening at the plate since there are two different thread pitches.

The thread pitch relationship between the first and second threads could be reversed for applications where quick loosening is desirable.

It should be also appreciated that the plate could be a metal plate formed by extruding a deep central opening or a composite plate wherein the steel plate has a plastic hub portion assembled into the steel plate. In addition, the specific shape of the plate is not critical. For example, the plate could be square or numerous other shapes.

The dimensions for one example of the fastener/plate assembly 10 are set forth in Table I.

TABLE I

| | |
|---|---|
| D | .289 inch |
| X | .255 inch |
| Y | .250 inch |
| Z | .312 inch |
| W | .202 inch |

Figure 6:
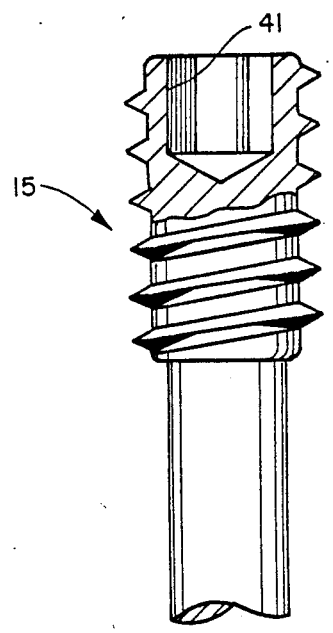
FIG. 6 is an enlarged fragmentary side elevational view of an alternate embodiment of a fastener for the assembly of FIG. 1.

With reference to FIG. 6, an alternate embodiment of the fastener 15 differs from fastener 14 at the driver end portion. A socket 41 extends axially into the fastener top to facilitate a hex torque driver coupling with the fastener. All other dimensional relationships as described for fastener 14 are applicable to fastener 15.

While the preferred embodiments of the invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fastener/plate assembly for fastening material to a substrate comprising:

plate means comprising a plate having a hub portion defining a central axial opening having a pre-established diameter;

fastener means comprising a drive means at a proximal end and a distal end and a shank having two thread sections, one section adjacent said distal end having a first thread with a maximum thread diameter less than the diameter of a said central opening, the other shank section having a second thread with a maximum thread diameter greater than the central opening diameter and dimensioned to self-tap into the hop portion and become threadedly enagageable with said hub portion, so that said fastener means first thread is loosely insertable in said opening and upon suitably torqueably driving said driver means into a substrate, said second thread threadably engages said hub portion and wherein the assembly exerts a holding force against material disposed between said plate and substrate which holding force substantially consists of composite forces exerted through said first and second threads.

2. The fastener/plate assembly of claim 1 wherein said plate has an upper surface and a lower surface, and further comprising anti-rotational means depending from one of said upper or lower surfaces for preventing rotation of the plate.

3. The fastener/plate assembly of claim 1 wherein said fastener further comprises a non-threaded shank portion axially intermediate said first and second threads.

4. The fastener/plate assembly of claim 1 wherein said driver means comprises an axially externally extending polygon-shaped connector.

5. The fastener/plate assembly of claim 1 wherein said driver means defines an axial recessed polygon-shaped socket.

6. The fastener/plate assembly of claim 1 wherein the thread pitch of said first thread is different from the thread pitch of said second thread.

7. The fastener/plate assembly of claim 6 wherein the thread pitch of said first thread is greater than the thread pitch of said second thread.

8. The fastener/plate assembly of claim 1 wherein said second thread is threadably engageable with said hub portion upon torqueably driving said driver means in a first direction and upon continued torqueable drive in said first direction said fastener means is disengageable from said plate wherein said driver means axially traverses through said opening.

9. The fastener/plate assembly of claim 1 wherein said second thread portion is threadably engageable with said hub upon application of a torque drive in a first direction and the diameter of said drive is dimensioned to permit disengagement of said fastener from said hub upon continued torque drive application in said first direction.

10. A fastener/plate assembly for fastening material to a substrate comprising:

plate means comprising a plate having a hub portion, said hub portion defining a central opening have a pre-established diameter; and fastener means comprising a driver end and a distal end and a shank having two thread sections, one thread section adjacent said distal end having a first thread with a maximum thread diameter less than the diameter of a said central opening and having a first thread pitch, the other shank thread section having a second thread with a diameter greater than said first thread maximum diameter and having a second thread pitch less than said first thread pitch, the first thread section being threadedly enagageable with a substrate, the second thread portion being threadably engageable with said hub upon application of a torque drive wherein the assembly exerts a hold force against a material disposed between said plate and substrate substantially consisting of composite forces exerted through said first and second threads.

11. The fastener/plate assembly of claim 10 wherein said plate has an upper surface and a lower surface, and further comprising anti-rotational means depending from one of said upper or lower surfaces for preventing rotation of the plate.

12. The fastener/plate assembly of claim 10 wherein said fastener further comprises a non-threaded section axially intermediate said first and second threads.

13. The fastener/plate assembly of claim 10 wherein said driver end defines an axial socket.

14. The fastener/plate assembly of claim 10 wherein said driver end comprises an axially extending hex-shaped connector.

15. A fastener/plate assembly for fastening material to a substrate comprising:

plate assembly means comprising a plate defining a central opening having a pre-established diameter;

fastener means comprising driver means for receiving a torque drive and a distal end, said fastener means comprising a shank having at least two thread sections and axially extending from said driver means to said distal end, one section adjacent said distal end having a first thread with a maximum thread diameter less than the diameter of said central opening, the other shank section having a second thread with a thread diameter greater than said first section, said second thread being threadably engageable with said plate, so that said fastener means first section is insertable through said opening and upon application of a torque to said driver means in a first direction, said first thread is threadably engageable with a substrate and said second thread is threadably engageable with said plate upon continued application of the torque, wherein the assembly exerts a holding force against a material disposed between said plate and substrate substantially consisting of forces exerted through said first and second threads.

16. The fastener/plate assembly of claim 15 wherein the pitch of the first thread is different from the pitch of the second thread.

17. The fastener/plate assembly of claim 15 wherein the pitch of the first thread is greater than the pitch of the second thread.

18. The fastener/plate assembly of claim 15 further comprising an intermediate unthreaded shank portion disposed between said first and second threads and having a diameter less than the diameter of the center opening.

19. The fastener/plate assembly of claim 15 wherein said second thread is threadably engageable with said plate and upon continued application of a torque in a first direction said second shank section is threadably disengageable from said plate to allow said driver means to axially pass through opening.

* * * * *